United States Patent
Yin et al.

(10) Patent No.: US 6,848,638 B2
(45) Date of Patent: Feb. 1, 2005

(54) APPARATUS AND METHODS FOR CUTTING FIBROUS FOOD PRODUCTS

(76) Inventors: Paul S. Yin, 28 Greenwood St., Lowell, MA (US) 01852; Tith Im, 16 Doane St., Apt. #1, Lowell, MA (US) 01851

( * ) Notice: Subject to any disclaimer, the term of this patent is extended or adjusted under 35 U.S.C. 154(b) by 149 days.

(21) Appl. No.: 10/267,701

(22) Filed: Oct. 9, 2002

(65) Prior Publication Data

US 2004/0069884 A1 Apr. 15, 2004

(51) Int. Cl.⁷ ............................................. B02C 1/08
(52) U.S. Cl. ...................................... 241/282.1; 241/92
(58) Field of Search .......................... 241/273.2, 278.1, 241/279, 92, 282.1

(56) References Cited

U.S. PATENT DOCUMENTS

| | | | |
|---|---|---|---|
| 4,072,277 A | | 2/1978 | Seydelmann |
| 4,173,310 A | | 11/1979 | Schaeffer |
| 4,198,887 A | | 4/1980 | Williams, Jr. |
| 4,256,265 A | | 3/1981 | Madan |
| 4,277,995 A | | 7/1981 | Sontheimer |
| 4,283,979 A | * | 8/1981 | Rakocy et al. .......... 83/666 |
| 4,331,300 A | | 5/1982 | Hicks et al. |
| 4,364,525 A | | 12/1982 | McClean |
| 4,393,737 A | | 7/1983 | Shibata |
| 4,448,100 A | | 5/1984 | Breeden |
| 4,458,848 A | | 7/1984 | Williams |
| 4,516,733 A | * | 5/1985 | Funagura et al. .......... 241/79 |
| 4,683,790 A | | 8/1987 | Bittner |
| 4,821,616 A | | 4/1989 | Mayeux et al. |
| 5,115,992 A | | 5/1992 | Nugent |
| 5,240,189 A | * | 8/1993 | Majkrzak et al. .......... 241/55 |
| 5,301,577 A | | 4/1994 | Flisram |
| 5,358,189 A | * | 10/1994 | Vandermolen .......... 241/92 |
| 5,467,930 A | * | 11/1995 | Lefevre .......... 241/84 |
| 6,148,702 A | | 11/2000 | Bucks |
| 6,299,085 B1 | | 10/2001 | Ekstrom |

* cited by examiner

*Primary Examiner*—Ed Tolan
(74) *Attorney, Agent, or Firm*—Mintz, Levin, Cohn, Ferris Glovsky and Popeo, P.C.; David F. Crosby, Esq.; Charles E. Bell, Esq.

(57) ABSTRACT

Improved apparatus and methods for making substantially crisp, clean, uniform cuts or slices from fibrous foodstuffs using a motorized food processing device with a unique cutting assembly, such that the foodstuffs are supported by the cutting assembly in a manner that lessens the potential for pulverization of the foodstuffs upon cutting. The invention can include a rotary cutting assembly having a rotary cutting blade and a blade spacer. The cutting blade can include a first cutting edge extending radially from a central portion of the rotary cutting blade. The blade spacer can include an opening adjacent to the first cutting edge of the blade for cut foodstuffs to pass through. The opening can also include a peripheral edge, a portion of which can be substantially aligned with the first cutting edge. The rotary cutting blade and blade spacer can be coupled to a rotatable hub, which can be adapted to engage a drive motor to rotate the rotary cutting assembly. The cutting edge of the blade can be disposed in a cutting plane, which can be located a distance, d, from an adjacent support surface of the blade spacer and adapted for cutting foodstuffs into slices having a thickness substantially the same as d. Thus, the cutting edge can be substantially congruent with a portion of the peripheral edge of the opening in the blade spacer.

18 Claims, 8 Drawing Sheets

APPARATUS AND METHODS FOR CUTTING FIBROUS FOOD PRODUCTS

BACKGROUND OF THE INVENTION

1. Field of the Invention

The invention herein pertains to a food processing apparatus and more particularly, to a cutting blade assembly for use in food processing devices for cutting, slicing or otherwise processing foodstuffs.

2. Description of the Related Art

The benefits of herbs and other such plants for flavor enhancement of foods, and as medicaments, have long been recognized, dating back thousands of years. As a result, herbs and other such fibrous plant tissues are in widespread use today by many, inter alia manufacturers of vitamins, restaurateurs, and individual consumers.

One of the problems associated with using such fibrous materials is the amount of preparation required to uniformly cut or slice the herbs for various uses. For example, consider that Thai, Vietnamese, Indian and other ethnic restaurants use, for example, lemon grass in their cuisine. Lemon grass is an aromatic tall grass with a thick stalk and tufty root; a cluster of lemon grass can grow to three feet in length. Typically, the coarse, straw-like tops need to be trimmed so that the stalks can be thinly sliced to impart its characteristic citrus flavor. The time required to prepare this particular herb and manually chop it into uniform, cross-sections is long and costly, mainly due to a lack of workplace efficiency for a restaurant. Ultimately, this lack of efficiency affects the profit margin for the restaurant.

Motorized food processors have been used to efficiently process foodstuffs for many years. However, previous food processors equipped with various styles of cutter blades have been generally ill-suited at obtaining uniform, crisp, clean slices of fibrous foodstuffs. Rather, such foodstuffs, e.g., herbs and other fibrous plants, processed using these machines are typically pulverized or otherwise reduced to an unidentifiable mass. In some situations pulverization can cause the essential oils, and hence flavor, of the herbs to be unnecessarily released.

For example, U.S. Pat. No. 4,072,277 to Seydelmann ("Seydelmann"), U.S. Pat. No. 4,173,310 to Schaeffer ("Schaeffer"), and U.S. Pat. No. 4,331,300 to Hicks et al., ("Hicks") use a convex cutting edge (Seydelmann and Schaeffer), or a straight razor blade-type cutter (Hicks), used in a bowl wherein the blade substantially sweeps the inner diameter of the bowl, wedging pieces of foodstuffs between the blade and the side of the bowl and randomly cutting the food. In the context of herbs, such random cuts could lead to nonuniform pieces, or pieces so small they cannot be used for the intended purpose.

Additionally, U.S. Pat. No. 4,277,995 to Sontheimer and U.S. Pat. No. 4,448,100 to Breeden employ a rotary slicing tool, having a hub with a disc-like member atop. The disc-like member has a horizontal area, which supports firm foodstuffs for slicing, and has an arcuate slot extending from the hub out to the periphery of the disc-like member. An arcuate slicing blade is mounted on the disc-like member behind the slot with its cutting edge projecting forward and elevated above the level of the horizontal area and facing forward above the slot carrying an arcuate slicing blade elevated above a horizontal area, and behind an arcuate slot, such that the slices of food pass through the slot. These inventions contemplate cutting or slicing firm foodstuffs such as for fruits, vegetables or meats, however.

Thus, none of the prior art appears to address how fibrous foodstuffs, such as, for example, scallions, chives, lemon grass and other herbs, can be presented or supported in such a way as to be repeatedly cut or sliced in a clean, crisp and uniform manner. A restaurant is therefore unable to use existing food processing machines to efficiently process many fibrous foods.

It would be desirable to provide apparatus and methods for processing fibrous materials that can provide the capability to make crisp, clean, uniform slices without pulverizing or otherwise diminishing the fibrous food material.

It would further be desirable to provide apparatus and methods for processing fibrous foodstuffs, such that the foodstuffs are not pulverized upon cutting.

SUMMARY OF THE INVENTION

In view of the foregoing, it is an object of this invention to provide improved apparatus and methods for making substantially crisp, clean, uniform cuts or slices of fibrous foodstuffs using a motorized food processing device.

It is also an object of the present invention to provide improved apparatus and methods for processing fibrous foodstuffs, in a manner that lessens the potential for pulverization upon cutting.

These and other objects of the present invention are accomplished by providing apparatus and methods for using a motor driven food processing device for cutting, slicing, or otherwise processing fibrous foodstuffs. In one aspect, the invention includes a rotary cutting assembly that can include a rotary cutting blade and a blade spacer. The cutting blade can include a first cutting edge extending radially from a central portion of the rotary cutting blade. The blade spacer can include an opening adjacent to the first cutting edge of the blade for cut foodstuffs to pass through. The opening can also include a peripheral edge, a portion of which can be substantially aligned with the first cutting edge. The rotary cutting blade and blade spacer can be coupled to a rotatable hub, which can be adapted to engage a drive motor to rotate the rotary cutting assembly.

In one embodiment, the cutting edge of the blade can be disposed in a cutting plane. The cutting plane can be located a distance, d, from an adjacent support surface of the blade spacer and adapted for cutting foodstuffs into slices having a thickness substantially the same as d. The cutting edge can, therefore, be substantially congruent with a portion of the peripheral edge of the opening in the blade spacer.

In another embodiment, the cutting blade can have one or more cutting edges. Each cutting edge can have a plurality of sharpened teeth spaced along at least a portion of the length of each of the cutting edges. The cutting edges can be convex, and can lead in the direction of rotation of the blade.

In still another embodiment, the rotary cutting assembly can include a stationary upper support. The upper support can include at least one opening through which foodstuffs are presented to the rotary cutting blade. Additional openings of the stationary upper support can be positioned substantially 120° apart. The diameter of the openings can range from about ¼" to about 1", and is preferably about 0.875".

In yet another embodiment, the rotary cutting assembly can further include a stationary lower support. The lower support can include a central portion with at least one arm extending outwardly therefrom and upward to fasten to the stationary upper support.

These upper and lower supports, and the hub, can be made from any food grade material or plastic. The cutting blade and blade spacer can be made from stainless steel, anodized metal, ceramic, glass, or any other suitable cutting material. Where the cutting blade and spacer are intended to be used to process food, the device can be constructed from materials approved for processing food.

In another aspect, the invention can include a rotary cutting assembly for use with a food processing device. The cutting assembly can include a stationary upper and lower support, a rotary cutting blade, a blade spacer, and a rotatable hub.

In yet another aspect, the invention can include a method of using a rotary cutting assembly for cutting or slicing foodstuffs. The method can include providing a cutting blade and a blade spacer. The blade spacer can include a support surface and an opening adjacent to the support surface. The opening can be adjacent to a cutting edge for cut foodstuffs to pass through. The opening can also include a peripheral edge, a portion of which can be substantially aligned with the cutting edge. The method can further include presenting foodstuffs to contact the surface of the blade spacer. The foodstuff can be presented prependicularly to the spacer. The method can be concluded by rotating a rotary cutting blade. The rotary cutting blade can include a first cutting edge extending radially from a central portion of the rotary cutting blade. This edge can be disposed in a cutting plane located a distance, d, from the support surface of the blade spacer and adapted for cutting foodstuffs into slices having a thickness substantially the same as d, whereby the cut foodstuffs fall through the opening adjacent the support surface.

In one embodiment, the method can additionally include providing a stationary upper support. The upper support can include at least one opening through which foodstuffs are presented to the rotary cutting blade. In another embodiment, the foodstuffs presented for cutting or slicing can include lemon grass, scallions, chives, or other fibrous foodstuffs.

Other features and advantages of the invention will be apparent from the following detailed description and claims.

BRIEF DESCRIPTION OF THE DRAWINGS

Further features of this invention, its nature and various advantages, will appear from the accompanying detailed description and drawings to those in which:

FIG. 6 is a top view of a stationary lower support according to the invention;

DETAILED DESCRIPTION OF THE INVENTION

The invention is directed to improved rotary cutting apparatus and methods of making substantially crisp, clean, uniform cuts or slices.

Figure 1:
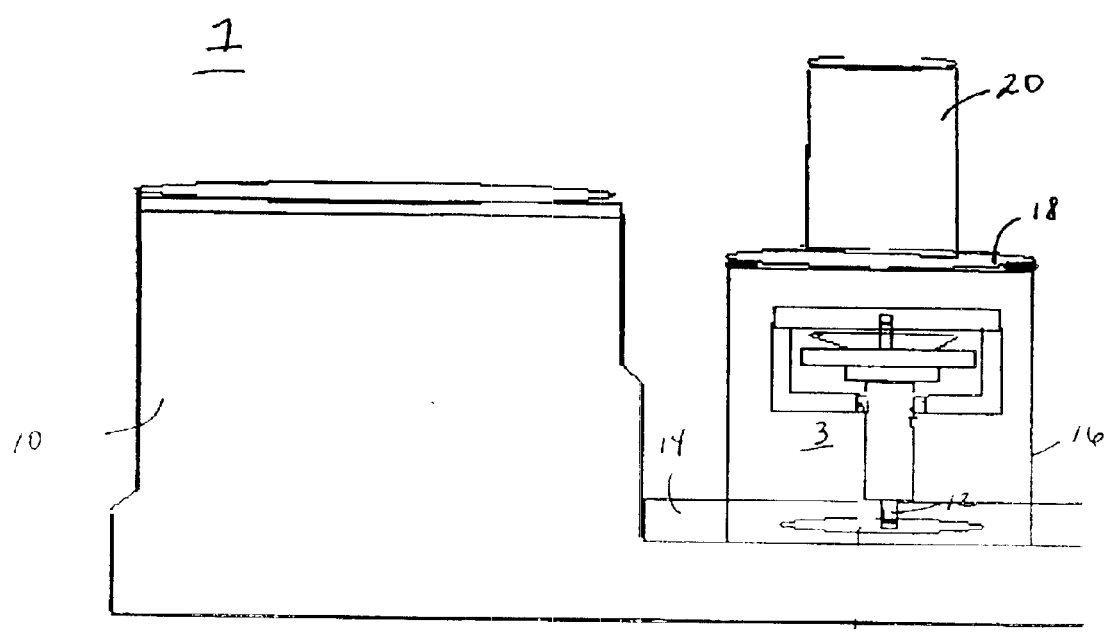
FIG. 1 is a diagramatic view of a rotary cutting assembly disposed in a conventional food processing device according to the invention.

Referring to FIG. 1, there is shown an embodiment of a rotary cutting assembly 3 dipsosed in a conventional food processor 1 according to the invention. The rotary cutting assembly 3 can be used to cut or slice fibrous foodstuffs. The food processor 1 can include a base housing 10 that can contain a motor (not shown) that can drive a shaft 12, either directly or indirectly. The base housing 10 can have a suitable platform 14 to support a processor bowl 16 covered by a lid 18. The lid 18 can be generally operable through an interlock that is well known in the art, so that the processor cannot be operated unless the lid is securely in place. Fibrous foodstuffs can be fed into the bowl 16 through the chute 20 where the rotating blade of the rotary cutting assembly 3 can cut or slice them according to the invention.

Figure 2:
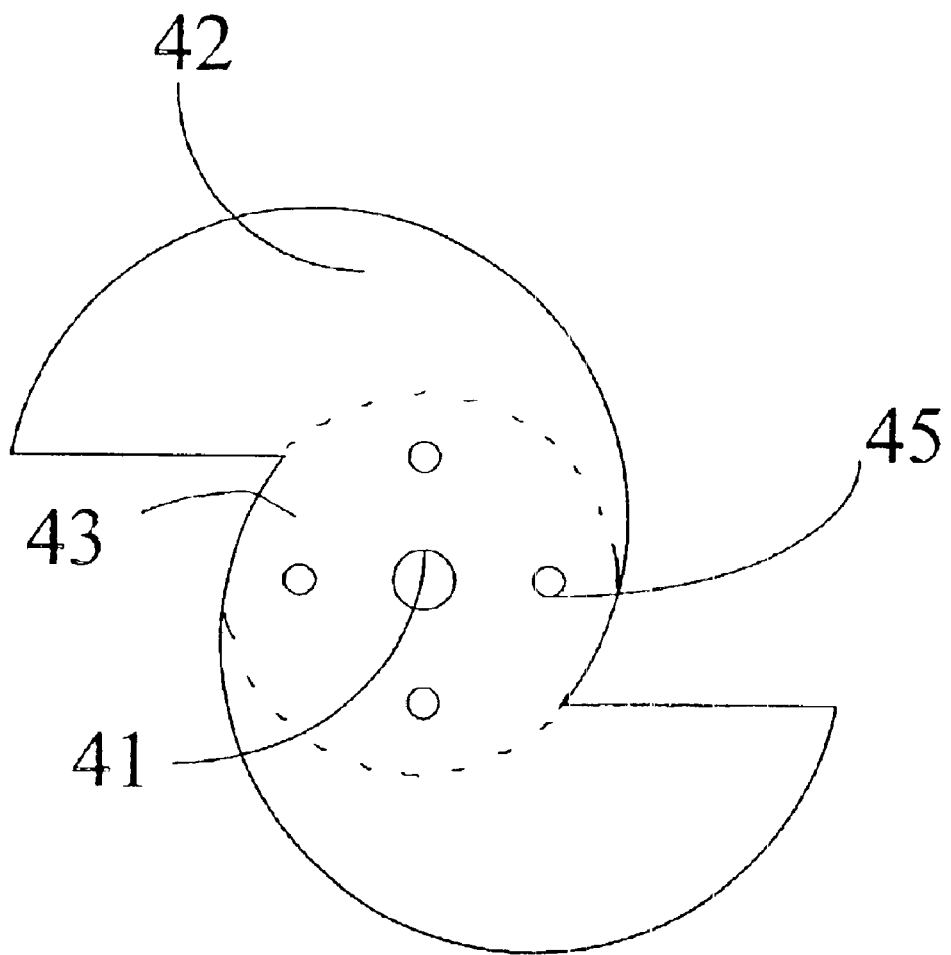
FIG. 2 is a top view of a rotary cutting blade according to the invention.

FIG. 2 shows a rotary cutting blade 40 according to the present invention. In one embodiment, the cutting blade 40 can have a central portion 43 (represented by dashed lines) with a center hole 41 therein. Thru holes 45 can be located equidistant from the center hole 41. The cutting blade 40 can include one or more cutting edges 42 which can extend radially outward from the central portion 43. The cutting edge 42 can lie in a cutting plane. When more than one cutting edge is provided, as in FIG. 2, the edges can preferably be symmetrically arranged to provide balanced rotation. In one embodiment, the cutting edges 42 of the blade 40 can be convex and have a plurality of sharpened teeth or serrations (not shown) spaced along at least a portion of the length of the cutting edge 42. Other linear and curved shapes can be selected depending upon the characteristics of the food processor, the foodstuffs to be processed, or the design of the blade spacer 50, shown in FIG. 3.

Figure 3:
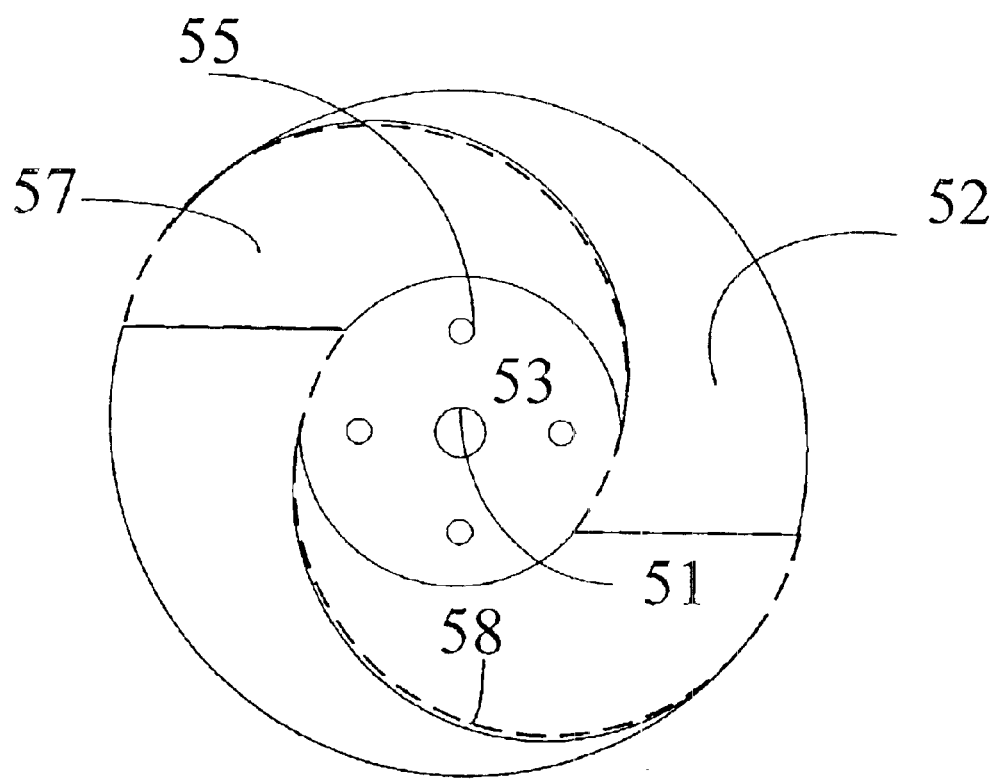
FIG. 3 is a top view of a blade spacer in relation to a cutting blade (represented by dashed lines) according to the invention.
Figure 7:
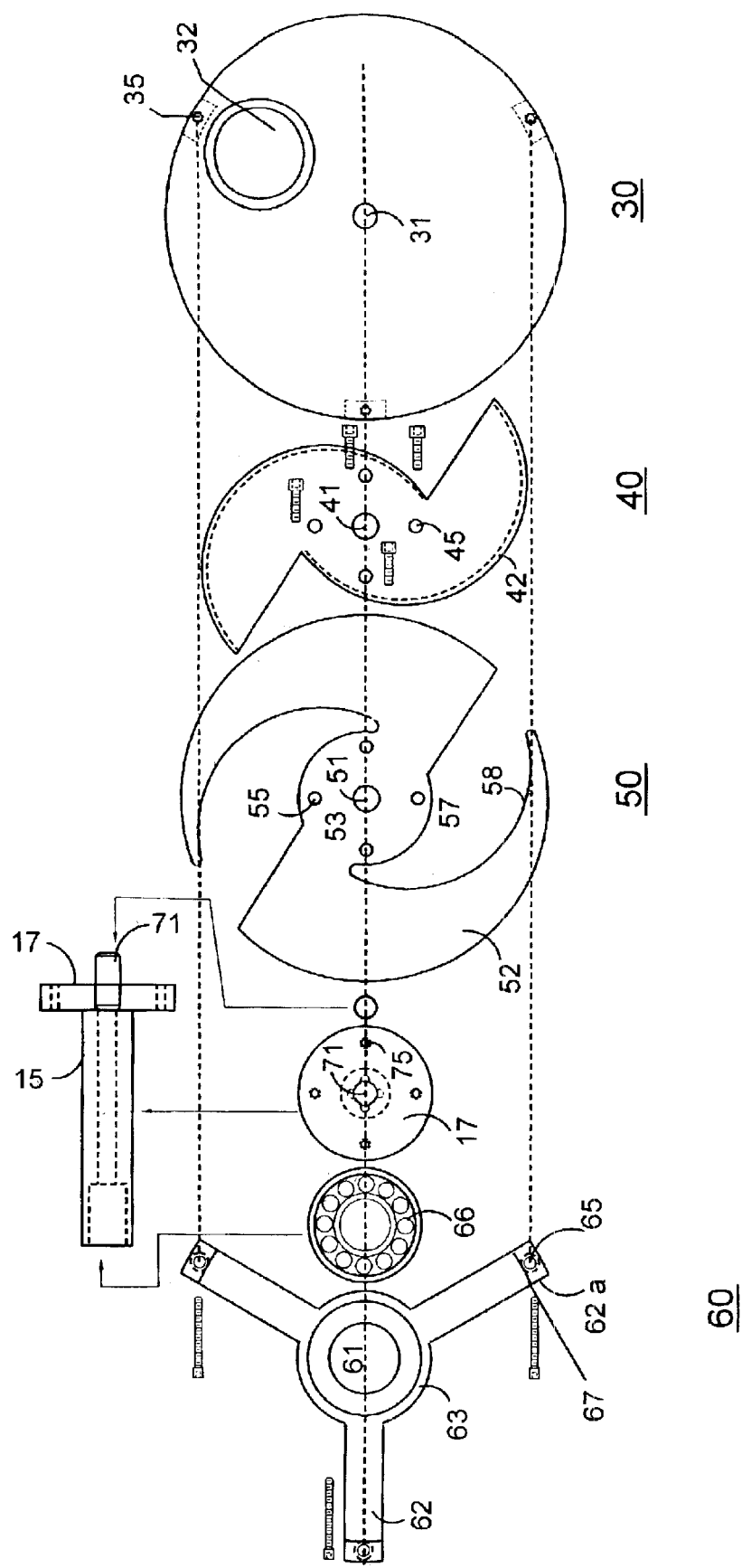
FIG. 7 is an assembly view of one embodiment of a rotary cutting assembly according to the invention.

FIG. 3 shows a blade spacer 50 in relation to the cutting blade 40 (in phantom view) according to the present invention. In one embodiment, the blade spacer 50 can have a central portion 53 with a center hole 51 therein. Thru holes 55 can be located equidistant from the center hole 51. The center hole 51 and the thru holes 55 can be substantially aligned with the center hole 41 and thru holes 45 of the cutting blade 40 (FIG. 7).

The spacer 50 can include a support surface 52, which can extend radially from the central portion 53, and an opening 57 adjacent to the surface 52 to allow foodstuffs to fall through in the bowl 16. The opening 57 can have a peripheral edge 58. The spacer 50 can have more than one support surface 52, and more than one opening 57.

In one embodiment the cutting edges 42 of the cutting blade 40 can be substantially aligned with the peripheral edges 58 of the opening 57. The distance from the center holes 41 and 51 to the outer edge of the spacer surface 52 and the outer edge of the cutting blade 40 can be substantially the same.

Figures 4A, 4B:
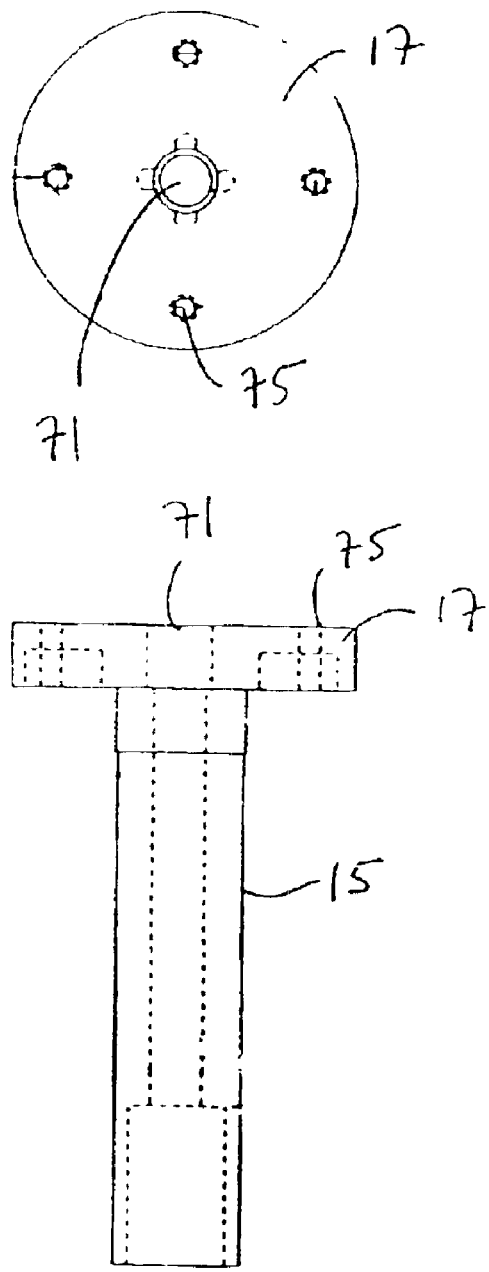
FIG. 4A is a top view of a hub according to the invention.
FIG. 4B is a side view of a hub according to the invention in relation to a space for accepting a driveshaft (represented by the dashed lines in the hub portion)

FIGS. 4A and 4B show a hub 15 according to the present invention. The hub 15 can have a flange 17 positioned at one end. The flange 17 can have a central hole 71 that can accept a pin (not shown) and thru holes 75 positioned around the perimeter, which can coincide with thru holes 45 and 55 of the cutting blade 40 and blade spacer 50 to be securely fastened thereto. The hub 15 can be adapted at the end opposite the flange 17 to slip over and engage a motor driven drive shaft (not shown) of a conventional food processor.

Figure 5:
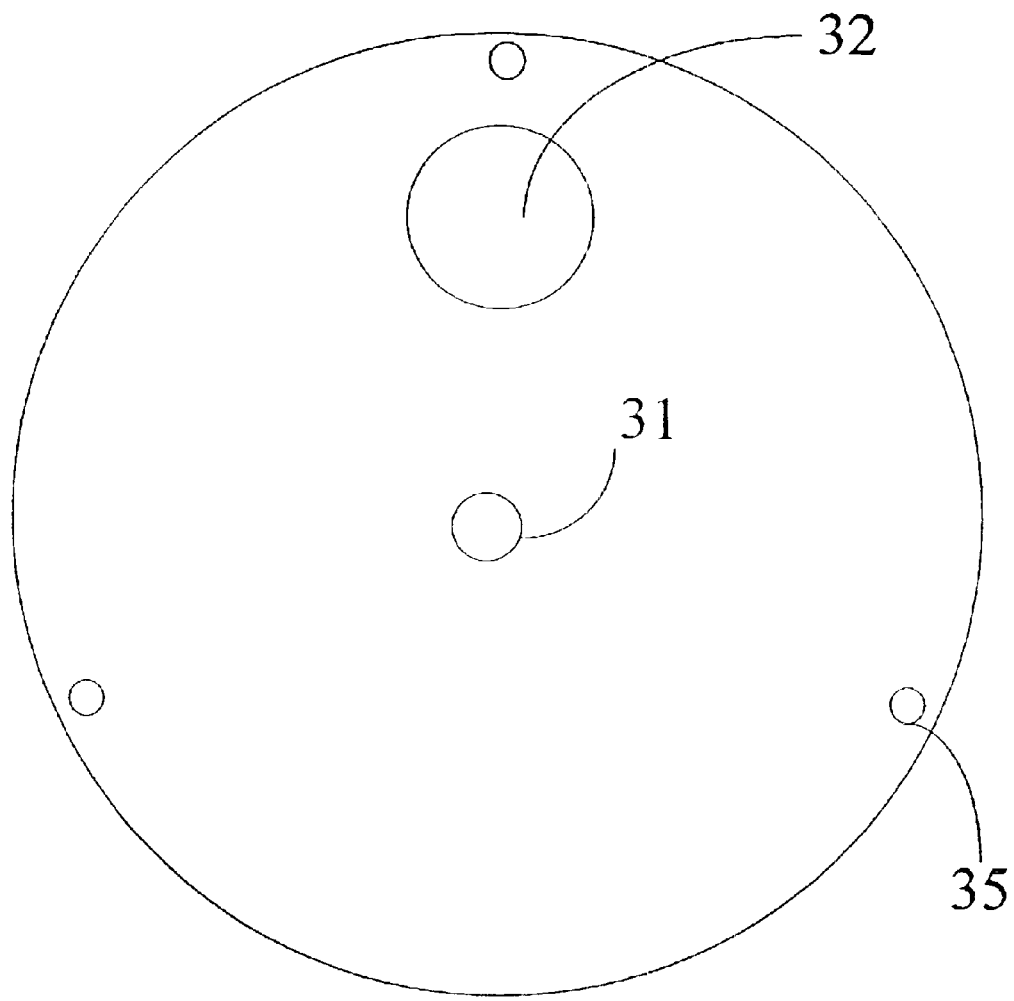
FIG. 5 is a top view of a stationary upper support according to the invention.
Figure 9:
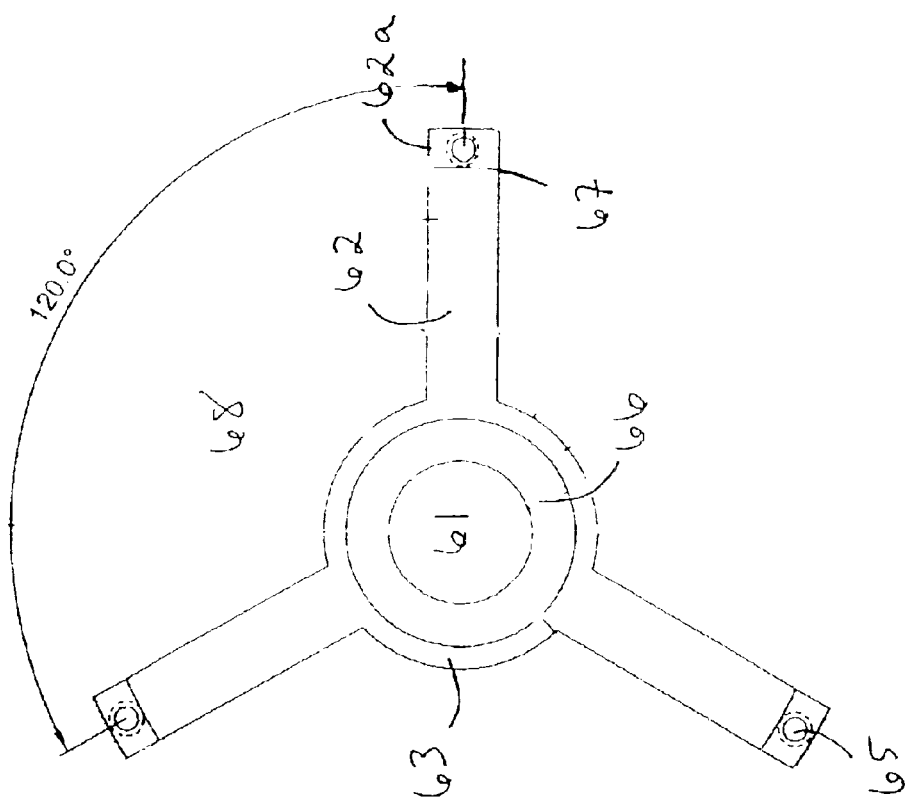

FIG. 5 shows a stationary upper support 30 according to the invention. The upper support 30 can have an opening 32 to allow foodstuffs to be fed into the rotary cutting blade 40, and a center hole 31. Thru holes 35 for securing the upper support 30 in place can be located around the perimeter. In other embodiments, additional openings through which foodstuffs can be fed into the rotary cutting blade can be provided. In embodiments where there is more than one opening 32, the openings can be spaced evenly, for example, substantially 120° apart. The diameter of the openings 32 can range from about ¼" to about 1", or greater, and preferably about 0.875". The diameter of the upper support 30 can measure substantially 4".

FIG. 6 shows the lower support 60 according to the present invention. The lower support 60 can have a central portion 63 with a center hole 61 therein. A bearing assembly 66 (FIGS. 7 & 8) can be positioned within the central portion 63. One or more support arms 62 can extend radially outward from the central portion 63 and upward 62a at an elbow 67 to fasten to the upper support 30. In accordance with the invention, the lower support 60 can include at least one support arm 62, and preferably three suppport arms 62 can be provided, positioned substantially 120° apart. Thru holes 65 can be located at the distal ends of the upward extending portion of the arms 62a. The diameter of the lower support 60 can be substantially 4.0". A space 68 can lie adjacent to the arms 62 so that the sliced foodstuffs can fall into the bowl of the food processor.

FIG. 7 shows the elements of an embodiment of the cutting device of the invention as viewed from the top down (right to left). In assembling one embodiment according to the invention, the center holes 41 and 51 can be substantially aligned with each other to accommodate the hub pin 71. The thru holes 45, 55 and 75 can be substantially aligned so that the blade spacer 50 and blade 40 can be coupled to the rotatable hub 15, via the flange 17. The blade 40 and blade spacer 50 can be coupled by any means well known in the art, such as by screws, rivets, spot welds, or other suitable means depending upon the materials being used for the cutting blade 40, blade spacer 50 and hub 15. When the cutting blade 40 and the blade spacer 50 are coupled together there can be substantially no space between the two. However, in other embodiments, the distance between the blade 40 and the spacer 50 can be varied, such as by the use of a spacer or shim (not shown).

The bearing 66 can be positioned in the central portion 63 of the lower support 60, and the hub 15 can be positioned through its center hole 61. The center hole 31 of the upper support 30 can be substantially aligned with the hub pin 71 such that the hub pin 71 can communicate with the center hole 31. The thru holes 35 and 65 can be substantially aligned so that the lower support 60 and the upper support 30 can be fastened together via screws, rivets, or other suitable means well known in the art. The hub 15 can then be mounted on a motor driven shaft. As assembled in accordance with the invention, the cutting device can allow the blade spacer 50 and blade 40 to move in the direction of rotation of the shaft, while the upper and lower support 30 and 60 can remain stationary.

Figure 8:
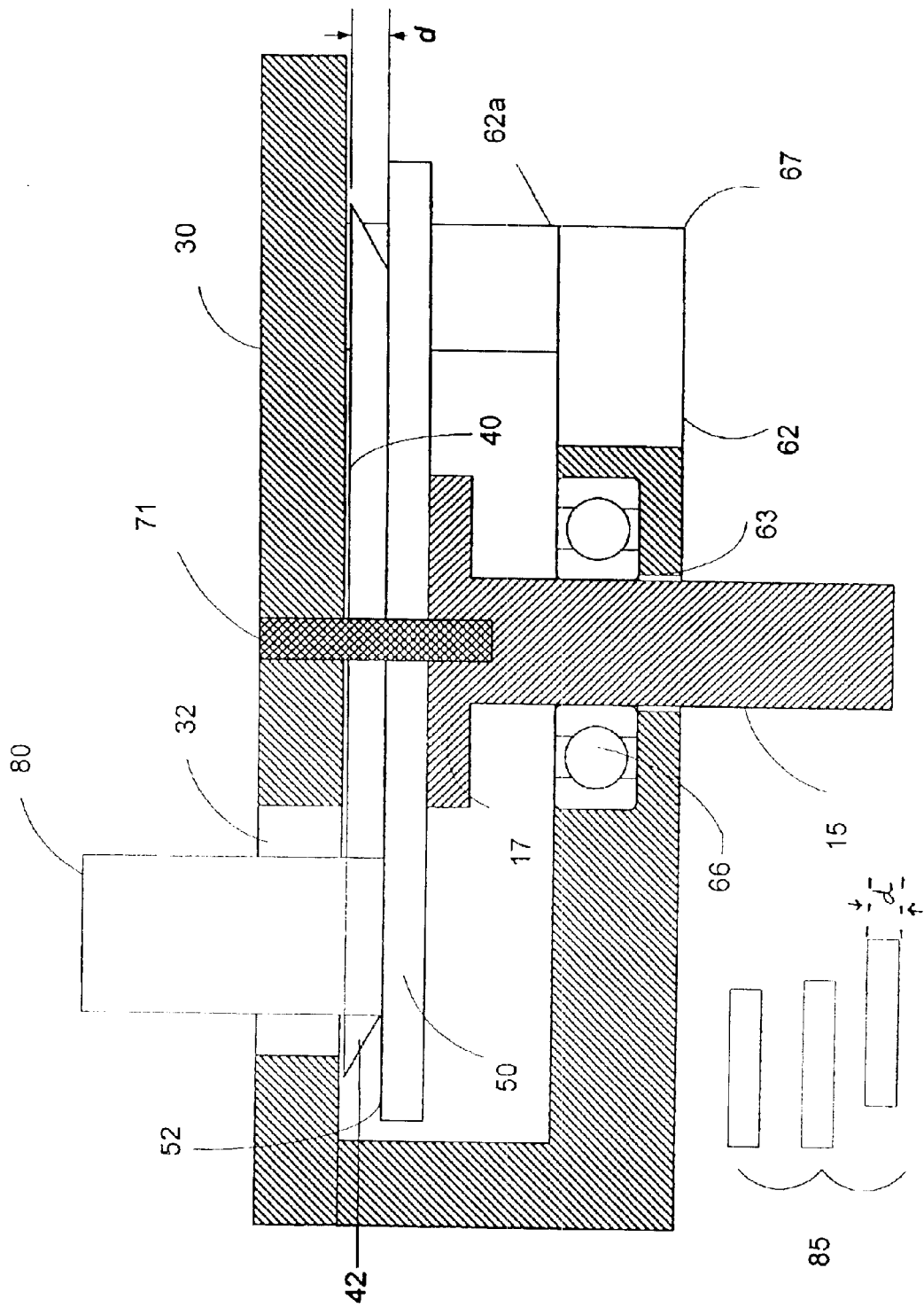
FIG. 8 is a cross-section view of a cutter assembly in functional operation according to the invention.

FIG. 8 shows the rotary cutting assembly of the invention. Fibrous foodstuffs 80, such as for example, lemon grass, scallions or chives, can be presented upright for passage through the openings 32 of the stationary upper support 30. The foodstuffs 80 can be substantially perpendicular to and contact the spacer surface 52 as they pass through the opening 32. While the foodstuff 80 is supported in place, the cutting edge 42 of the blade 40 can be rotated in a cutting plane, progressively slicing the fibrous foodstuffs 80 into a thickness substantially the distance between the cutting plane in which the cutting edge 42 can rotate and the spacer surface 52, given by d. The cut pieces 85 can drop through the spacer opening 57 and through the adjacent space 68 of the lower support 60, into the bowl 16.

Consequently, the cutting assembly allows for substantially crisp, clean and uniform cross-sections of fibrous foodstuffs to repeatedly be made using a motorized food processor. Further, the cutting assembly allows the substantially uniform cross-sections to be collected in a bowl without the possibility of additional cuts that would potentially lead to pulverization.

From the foregoing detailed description of the specific embodiments of the invention, it should be apparent that a unique cutting assembly for a motorized food processor has been described. Although particular embodiments have been disclosed herein in detail, this has been done by way of example for purposes of illustration only, and is not intended to be limiting with respect to the scope of the appended claims which follow. In particular, it is contemplated by the inventor that various substitutions, alterations, and modifications may be made to the invention without departing from the spirit and scope of the invention as defined by the claims.

We claim:

1. A rotary cutting assembly comprising:
    a rotary cutting blade, disposed in a first plane, said cutting blade including a first cutting edge extending radially from a central portion of the rotary cutting blade;
    a blade spacer, disposed in a second plane, parallel to said first plane, said spacer including an opening adjacent to the first cutting edge for cut foodstuffs to pass through, said opening including a peripheral edge, a portion of said peripheral edge being substantially aligned with said first cutting edge;
    a station upper support disposed in a third plane, said third plane located above and parallel to said first plane, wherein said upper support includes at least one opening in which to guide foodstuffs to the rotary cutting blade; and
    a rotatable hub coupled to said rotary cutting blade and said blade spacer, said rotatable hub being adapted to engage a drive motor to impart rotation of the rotary cutting assembly.

2. The cutting assembly of claim 1, wherein the first cutting edge is disposed in a cutting plane located a distance, d, from an adjacent surface of said blade spacer and adapted for cutting foodstuffs into slices having a thickness substantially the same as distance d.

3. The cutting assembly of claim 1, wherein the first cutting edge is substantially congruent with said portion of said peripheral edge of said opening.

4. The cutting assembly of claim 1, wherein the cutting blade has a plurality of cutting edges, said edges having a plurality of sharpened teeth spaced along at least a portion of the length of each of the cutting edges.

5. The cutting assembly of claim 1, wherein the first cutting edge is convex and leads in the direction of rotation.

6. The cutting assembly of claim 6, wherein additional openings of the stationary upper support are positioned substantially 120° apart.

7. The cutting assembly of claim 6, wherein the diameter of the openings range from about ¼" to about 1", and preferably about 0.875".

8. The cutting assembly of claim 1, further comprising a stationary lower support, disposed in a plane parallel to and beneath the second plane, said lower support including a central portion with at least one arm extending outwardly therefrom and upward to fasten to the stationary upper support.

9. The cutting assembly of claim 8, wherein the stationary upper and lower supports, and the hub are comprised of food grade plastic.

10. The cutting assembly of claim 8, wherein the cutting blade and blade spacer are selected from the group consisting of stainless steel, anodized metal, ceramic, and glass.

11. A rotary cutting assembly for use in a food processor comprising:

a stationary upper support, disposed in a first plane, said upper support having at least one opening through which foodstuffs are presented to a rotary cutting blade;

a rotary cutting blade, disposed in a second plane, parallel to said first plane, said cutting blade including a first cutting edge extending radially from a central portion of the rotary cutting blade;

a blade spacer, disposed in a third plane, parallel to the first and second plane, said blade spacer including an opening adjacent to the first cutting edge for cut foodstuffs to pass through, said opening including a peripheral edge, a portion of said peripheral edge being substantially aligned with said first cutting edge;

a stationary lower support, disposed in a fourth plane, and parallel to said first plane, said lower support having a central portion and at least one arm extending outward therefrom to fasten to the stationary upper support; and a rotatable hub coupled to said rotary cutting blade and said blade spacer, said rotatable hub being adapted to engage a drive motor to impart rotation of the rotary cutting assembly.

12. The cutting assembly of claim 11, wherein the first cutting edge is disposed in a cutting plane located a distance, d, from an adjacent surface of said blade spacer and adapted for cutting foodstuffs into slices having a thickness substantially the same as d.

13. The cutting assembly of claim 11, wherein the first cutting edge is substantially congruent with said portion of said peripheral edge of said first opening.

14. The cutting assembly of claim 11, wherein the first cutting edge is convex, and leads in the direction of rotation.

15. The cutting assembly of claim 11, wherein the cutting blade has a plurality of cutting edges, said edges having a plurality of sharpened teeth spaced along at least a portion of the length of each of the cutting edges.

16. The cutting assembly of claim 11, wherein the stationary upper and lower supports, and the hub are comprised of food grade plastic, and wherein the cutting blade and blade spacer are selected from the group consisting of stainless steel, anodized metal, ceramic, and glass.

17. A method of using a rotary cutting assembly for cutting or slicing foodstuffs, comprising:

providing a blade spacer, disposed in a second plane, parallel to and below a first plane, wherein said blade spacer includes a support surface and an opening adjacent said support surface for cut foodstuffs to pass through, said opening being adjacent a first cutting edge, and wherein said opening includes a peripheral edge, a portion of said peripheral edge being substantially aligned with said first cutting edge;

providing a stationary upper support disposed in a third plane, said third plane located above and parallel to said first plane, wherein said upper support includes at least one opening in which to guide foodstuffs to a rotary cutting blade;

presenting foodstuffs through said at least one opening in said upper support in a direction substantially perpendicular to the first plane, to contact the support surface of the blade spacer; and rotating a rotary cutting blade, disposed in a first plane, said cutting blade including a first cutting edge extending radially outward from a central portion of the rotary cutting blade, said first cutting edge disposed in a cutting plane located a distance, d, from the support surface of said blade spacer and adapted for cutting foodstuffs into slices having a thickness substantially the same as d, whereby the cut foodstuffs fall through the opening adjacent to the support surface.

18. The method of claim 17, wherein the foodstuff is selected from the group consisting of lemon grass, scallions, chives, and other fibrous foodstuffs.

\* \* \* \* \*